May 27, 1952            J. NASH            2,597,892

ALTITUDE CONTROLLING AUTOPILOT FOR AIRCRAFT

Filed Jan. 9, 1947            2 SHEETS—SHEET 1

INVENTOR
JOHN NASH
BY
his ATTORNEY.

INVENTOR
JOHN NASH
BY Herbert V. Thompson
his ATTORNEY.

Patented May 27, 1952

2,597,892

UNITED STATES PATENT OFFICE 2,597,892

ALTITUDE CONTROLLING AUTOPILOT FOR AIRCRAFT

John Nash, Brentford, England, assignor to The Sperry Corporation, a corporation of Delaware Application January 9, 1947, Serial No. 721,111

10 Claims. (Cl. 244—77)

1

This invention relates to aircraft of the pressure cabin type that operate at high altitudes and is particularly concerned with the provision of an improved altitude control means for such a craft.

In accordance with the invention, an altitude controller is provided in an aircraft autopilot that normally operates to maintain the craft at the higher of two predetermined elevation levels and becomes effective should the cabin of the craft lose its pressure for any reason to cause the craft to descend and level off at the lower of the predetermined elevations. The lower of the flight altitudes is one that provides a safe margin over the highest terrain along the route of the craft.

Inasmuch as the improved altitude control means is entirely automatic, the means functions as a safety device that is effective, should the persons in the cabin of the craft lose consciousness due to loss of pressure at the high altitude, to bring the craft to an elevation at which the pressure is such that it is possible for the persons in the cabin to regain consciousness. Consequently, the primary object of the present invention is to prevent loss of life in autopiloted craft of this character due to loss of pressure in the cabin.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects, features and structural details of the invention not at this time particularly enumerated will be understood from the following detailed description of the same.

An illustrative embodiment of the invention is shown in the accompanying drawings in which.

With reference to the drawings, the invention is illustrated in connection with an autopilot of

Figure 1:
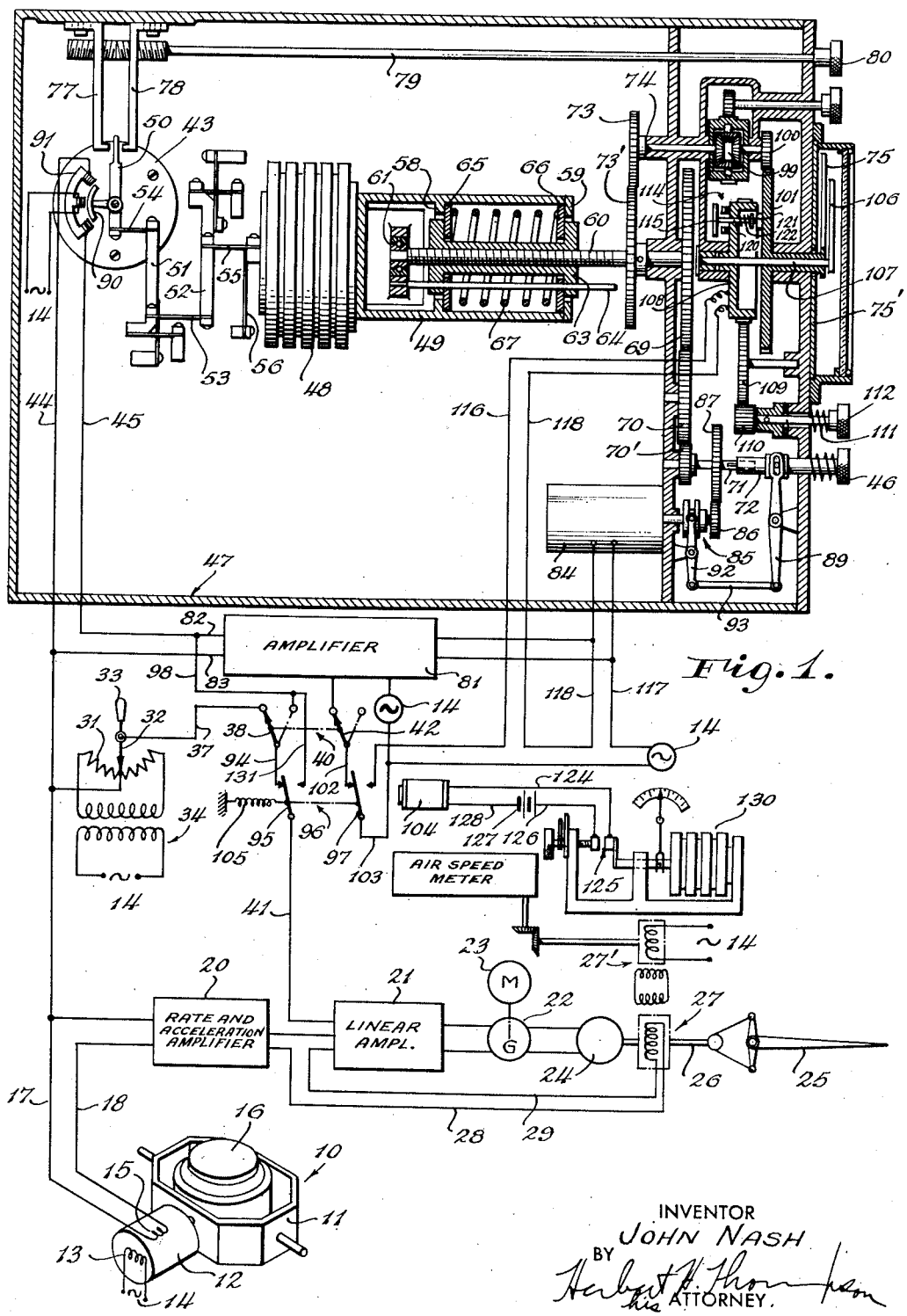
Fig. 1 is a schematic new and wiring diagram of an aircraft autopilot having the improved altitude control means included therein.

2 the character shown and described in application Serial No. 189,437, filed October 10, 1950 by John C. Newton. As also illustrated in Fig. 1 of the present application, an autopilot incorporating the improved altitude controller or altitude control means may include a gyro-vertical as indicated at 10 whose ring 11 is provided with a pitch axis pick-off 12. As shown, pick-off 12 is a selsyn device whose rotor winding 13 is energized from a suitable source 14 of electrical energy. The rotor winding 13 is mounted to move with the rotor case 16 of the gyro-vertical so that the pick-off provides an output when the craft tilts about its athwart ship axis whose amplitude is dependent upon the degree of tilt and whose phase is dependent upon the direction of tilt. The stator winding of the selsyn device is indicated at 15. Leads 17 and 18 carry the output signal of the pick-off 12. This portion of the described autopilot is conventional and is included herein in order to show a complete autopilot structure of the character claimed.

The autopilot, as shown, may also include a rate and acceleration amplifier as indicated generally at 20 that receives the output of the pick-off 12. The output of amplifier 20 is shown as fed to a suitable linear amplifier 21 that in turn energizes the field winding (not shown) of a generator 22 whose armature is driven at a constant speed by a motor 23. The output of generator 22 is fed to an electric servomotor 24 that is operatively connected to the elevators 25 or other means for controlling the altitude of the craft by way of a suitable shaft 26. In the illustrated autopilot, a device for measuring the movement of shaft 26 from its null position may be incorporated in the system. The system may also include a device for measuring the air speed of the craft. These respective devices may control a pair of selsyn instruments as indicated at 27 and 27', one of whose rotors is operatively connected to the air speed meter and the other of whose rotors is formed as a part of shaft 26. The instruments 27 and 27' are shown connected in series and the output of instrument 27 is fed by way of leads 28 and 29 to the linear amplifier 21 in opposition to the signal supplied the same from amplifier 20. The herein described autopilot parts, such as the amplifier, the servomotor and the feedback circuit are particularly shown and described in U. S. Letters Patent No. 2,511,846, issued June 20, 1950 to Percy Halpert and per se form no part of the present invention.

In order to properly control the craft so the same assumes different pitch attitudes, the displacement signal of pick-off 12 is fed to the linear amplifier 21 by way of a trimming circuit that includes potentiometer 31, the movable arm 32 of which is set by a manual control knob 33. The knob 33 is set so as to correct the autopilot for a given load and air speed of the craft. As shown, the source 14 energizes the center-tapped potentiometer 31 by way of transformer 34. The arm 32 of the potentiometer is connected to the linear amplifier 21 by way of lead 37, arm 38 of a double-pole double throw switch 40, lead 94, armature 95 of a compound relay 96 and lead 41. With arm 38 and armature 95 in the full line position shown in the drawing, the system described constitutes a complete autopilot operable to control the craft about its pitch axis without the improved altitude controller. The second arm of switch 40 is indicated at 42. The second armature of the relay 96 is indicated at 97.

The described autopilot may be supplemented by the inclusion of an altitude control means of the character shown and described in the hereinbefore noted Newton application by throwing switch 40 so that the arms 38 and 42 thereof assume the position in which the same are illustrated in dotted lines in Fig. 1. When switch 40 is so positioned, the trim potentiometer 31 is disconnected and a second pick-off indicated at 43 is included in series with the pick-off 12 to feed the linear amplifier of autopilot. Pick-off 43 may be a three-legged transformer type device of the character shown and described in U. S. Letters Patent No. 2,419,979, issued May 6, 1947 to Jack C. Wilson. The armature and wound stator of the pick-off 43 are respectively indicated at 90 and 91. Stator 91 is energized from source 14 and the output of the pick-off is fed to leads 44 and 45. Lead 44 connects with lead 17 and lead 45 connects with lead 41 when arm 38 of switch 40 is in the dotted line position and armature 95 of relay 96 is in the full line position by way of lead 98. The stator and armature parts of pick-off 43 are relatively movable to provide an output signal effective to operate motor 24 of the autopilot. This operating signal is supplied to the autopilot amplifier 21 by way of lead 45, lead 98, arm 38 of switch 40, lead 94, armature 95 of relay 96, and lead 41.

Figure 2:
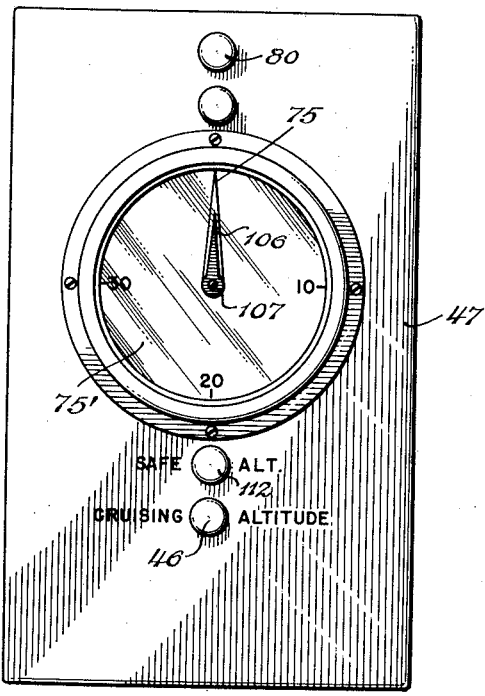
Fig. 2 is a front elevation of the altimeter of the autopilot shown in Fig. 1 and Figs. 3 and 4 are detail views showing the means for stopping the automatic movement of the altitude control knob in respectively effective and ineffective positions.

The illustrated type of altitude controller further includes a manually settable altitude control knob indicated at 46. As shown, the pick-off 43 and the other altitude controller parts are situated within a housing 47. Knob 46 is situated exteriorly of the housing at a position relative to the front wall of the housing where it is readily accessible to the human pilot as shown in Fig. 2. Means of the character described in the hereinbefore noted Newton application are provided for operatively connecting the control knob 46 and the armature 90 of pick-off 43. As shown, this means is a linkage system that includes an aneroid bellows 48 and an overtravel device 49. The system further includes an arm 50 that moves the armature 90 of pick-off 43 about its axis when the control knob 46 is moved. The linkage system also includes two spring pivoted normally parallel arms 51 and 52 that are connected by flat spring 53. Flat spring 54 connects arm 51 and the pivoted arm 50. One end of the aneroid bellows is connected to the arm 52 by a flat spring 55. A vertical spring 56 is connected to support one end of the bellows 48. The arrangement of this portion of the linkage within the housing 47 is such as to normally position arm 50 so that the pick-off produces a null output.

With displacement of the horizontal spring 55 to the right or left as viewed in Fig. 1 of the drawing, the arms of the linkage are moved correspondingly to move the armature of the pick-off 43 so the same produces an output whose amplitude depends on the extent of the movement and whose phase depends on the direction of the movement. The described portion of the linkage system is self-centralizing so that when the force causing the displacement of spring 55 is removed, the arm 50 automatically returns to its normal position.

An opening (not shown) is provided in the housing 47 of the controller, so that the aneroid bellows 48 is responsive to atmospheric pressure changes.

The connection between the pick-off 43 and knob 46 includes the overtravel device 49 which has a hollow cylindrical casing fixed to the right-hand end of the aneroid bellows as viewed in Fig. 1. The construction of the device shown in the drawing indicates that the casing has an internal flange 58 and an end flange plate 59 that is fixed to the casing in a suitable manner. The device further includes a threaded rod 60 that is rotated mounted in the housing 47 by means of bearings 61 and 62. A spool shaped piece 63 meshes with the rod 60 and is moved axially thereby. A pin 64 fixed in the casing engages the piece 63 to prevent the same from rotating with rod 60 and to insure that the piece moves in an axial direction either toward the right or left as viewed in Fig. 1 when rod 60 is turned. Translatory motion is communicated between the parts of the overtravel device by the cylindrical plates 65 and 66 with the compression spring 67 therebetween. Plate 65, as shown, normally engages the inside wall of flange 58 and the inside left wall of the spool shaped piece 63. Similarly, plate 66 normally engages the inside wall of flange plate 59 and the inside right wall of the spool shaped piece 63. Rod 60 is connected to the knob 46 by way of gear 69, gear 70, gear 70', shaft 71 and slide connection 72.

Gear 73 meshing with gear 73' on rod 60 drives a shaft 74 to position an altitude indicating pointer 75 situated on the exterior of the housing. Pointer 75 is read in relation to a fixed dial 75' having altitude indications thereon as shown in Fig. 2. Gears 73 and 73' may be of the elliptical or other variable ratio type to compensate for the non-linear relation between bellows length and altitude. A differential 99 adjusts the pointer for changes in barometric pressure at sea level The output gear of the differential is indicated at 100. Gear 100 meshes with a gear 101 which has a sleeve connection to the pointer 75.

The altitude controller further includes means for limiting the output signal of the pick-off 43 to prevent the operation of the autopilot to an extent such that the elevators would move the craft to greater than a desired angle of pitch. This prevents the angle of climb or descent of the craft from exceeding a predetermined desired limit. This result is obtained in the present instance by a stop means for limiting the extent of movement of the armature of pick-off 43 by knob 46. As shown in Fig. 1, a pair of oppositely movable limit pieces 77 and 78 cooperate with arm 50 of the linkage system in this connection. The spacing of the pieces 77 and 78 may be adjusted to permit more or less motion of arm 50 as desired by rod 79, and the manually settable knob 80.

With the described type of altitude controller in operation in the autopilot, the human pilot changes altitude by moving knob 46 until the pointer 75 is properly set at the desired altitude on dial 75'. This operation can be effected immediately because of the overtravel device 49 and the stop means, the first of which enables the knob 46 to be turned to the extent desired without overstraining the bellows 48 and the second of which prevents the autopilot from operating with more than a predetermined angle of pitch of the craft. In operation, as the knob 46 is turned, the rod 60 rotates to cause translation of spool piece 63. This moves the linkage system to the left or right, in Fig. 1, depending on the direction that knob 46 is turned and moves arm 50 of pick-off 43 to operate the autopilot. Spring 67 of the overtravel device is sufficiently weak as not to overload the bellows 48 so that spool piece 63 can be moved to the right or left to a greater extent than the casing of the device 49. When this occurs, the spring 67 is compressed by more than a normal amount until restored by the change in length of the aneroid bellows 48 as the craft reaches the desired altitude.

When switch 40 is set so that the arms 38 and 42 thereof are in the full line position, the altitude controller is rendered ineffective. In order to insure that the controller is properly conditioned to be included in the autopilot at any time, the output of the pick-off 43 is fed to an amplifier 81 by way of leads 82 and 83. Amplifier 81 is connected to the power supply 14 through arm 42 of switch 40 so that when the controller is included in the autopilot, the line including the supply is broken. When the arms of the switch 40 are positioned as indicated by the full lines, arm 42 closes the circuit between the amplifier 81 and its power supply. This circuit also includes lead 102, armature 97 of relay 96 and lead 103. The output of amplifier 81 is fed to a motor generally indicated at 84 that drives rod 60 and knob 46 through clutch 85 and gears 86 and 87, the last of which is situated on shaft 71. Clutch 85 provides a means for operatively connecting motor 84 and knob 46. Means are further provided in the form of a linkage system including pivoted arms 89 and 92 and link 93 for disconnecting the clutch 85 when the knob 46 is manually actuated. Knob 46 is pushed inwardly against the action of its holding spring to slide the connection 72 and operate the linkage 89, 93 and 92 to open the clutch 85. With this follow-up system, the pointer 75 provides a continuous indication of the altitude of the craft as the system is entirely controlled by the aneroid bellows 48. When switch 40 is operated to include the altitude controller in the autopilot, pointer 75 and pick-off 43 are at their proper initial positions to facilitate the change in altitude of the craft by the control knob 46.

The coil of relay 96 is indicated at 104. Spring 105 normally holds the armatures 95 and 97 in the open position of the relay 96 as shown in the full line position thereof in Fig. 1.

The autopilot in which the improved altitude control means is incorporated is particularly adapted for use in aircraft of the pressure cabin type that operate at high altitudes. The altitude control means of the present invention is adapted to maintain the craft at the higher of two predetermined levels of flight and includes means responsive to loss in pressure in the pressure cabin for operating the altitude control means to cause the craft to descend and level off at the lower of the predetermined flight levels. It is understood that any suitable means may be provided to maintain the air pressure within the cabin at a desired level. The present invention becomes automatically effective if such air pressure maintaining means breaks down or if the same has insufficient capacity to maintain the pressure at the necessary level when there is pressure leakage from the cabin.

Figure 4:
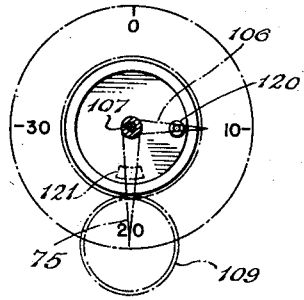

Control knob 46 together with pointer 75 provide the part of the altitude control means that is normally effective to maintain the craft at the higher of the predetermined flight levels. The lower of the predetermined flight levels is determined by the setting of a second pointer 106 on dial 75'. Pointer 106 is set on the dial at an altitude that provides a safe margin over the highest terrain along the route of the craft through means including shaft 107, gears 108, 109 and 110, shaft 111 and knob 112. Fig. 4 shows the relative positions of pointers 75 and 106 in an example explaining the operation of the improved altitude controller. In this figure, pointer 75 shows the craft to be cruising at an altitude of 20,000 feet elevation and pointer 106 has been set at an indicated elevation of 10,000 feet. Knob 46 determines the normal altitude of the craft and knob 112 determines the safe altitude that the craft could descend to.

The invention provides normally ineffective means for moving the manually settable knob 46 to cause the craft to descend to the predetermined lower elevation. In the form of the invention shown, this means comprises a normally open circuit including a normally closed switch 114, shown in the open position in Fig. 1, having spaced contacts and a movable arm 115, lead 116 relay 96, lead 103, source 14, lead 117, motor 84 and lead 118. The circuit is normally opened at the relay 96, the spring 95 holding the armature 97 in its open position.

Figure 3:
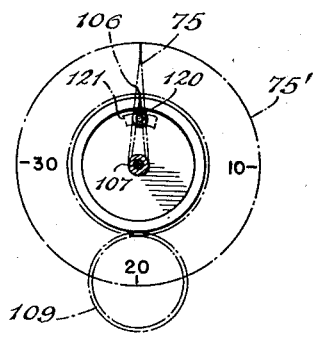

As shown in Fig. 1, arm 115 is provided as part of a cam follower 120 that is slidably mounted on gear 108. Follower 120 cooperates with cam piece 121 on gear 101 to move the arm 115 to its open position in which the same is shown in Figs. 1 and 3. Normally spring 122 urges the follower 120 so that switch 114 is in closed condition which is the case where the craft is in the air and the pointers 75 and 106 are set at other than the same position on the dial 75', Fig. 4. Cam 121 and follower 120 provide a means for opening the motor circuit when knob 46 has been moved automatically sufficiently to move pointer 75 counter-clockwise as viewed in Fig. 4 until the position of the pointer corresponds with that of the pointer 106.

The circuit including the drive motor for knob 46 is rendered effective by closing the same responsive to loss of pressure in the pressure cabin. This closing means is provided by a second circuit shown in Fig. 1 to include the coil 104 of relay 96, lead 124, normally open switch 125, lead 126, battery 127, and lead 128. One of the contact elements of switch 125 is connected to the movable end of an aneroid bellows 130 that is situated within the pressure cabin of the craft and is responsive to loss of pressure in the cabin to close switch 125 so that relay 96 is energized and the armatures 95 and 97 moved to assume the position in which the same are shown in Fig. 1 in dotted lines.

Because of lead 131 and armature 95, the relay 96 by-passes the switch 40 so that the altitude control means is automatically rendered effective by operation of the relay 96 even with switch 40 manually positioned as shown in full lines.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In an autopilot for aircraft of the pressure cabin type, an altitude controller including a manually settable knob for determining the flight level of the craft, and means responsive to loss of pressure in the pressure cabin for moving said knob to cause the craft to descend, and means for stopping the motion of said knob when the craft reaches a predetermined lower flight level.

2. In an elevator operating autopilot for aircraft of the pressure cabin type, an altitude controller having an elevation indicating knob settable manually to determine the flight level of the craft and a second elevation indicating knob settable manually at a lower indicated elevation than the first knob, and means responsive to loss of pressure in the pressure cabin for operating said first knob until the elevation indication thereof corresponds with the indication of said second knob.

3. In an elevator operating autopilot for aircraft of the pressure cabin type, an altitude controller having an elevation indicating pointer settable manually to determine the flight level of the craft and a second elevation indicating pointer settable manually at a lower indicated elevation than the first pointer, and means responsive to loss of pressure in the pressure cabin for operating said controller until the elevation indication of said first pointer corresponds with the indication of said second pointer.

4. In an autopilot for aircraft of the pressure cabin type, an altitude controller having a manually settable knob for determining the flight level of the craft, normally ineffective means for moving said knob to cause the craft to descend to a lower elevation, means for determining the lowermost position that the knob is movable to under control of said moving means, and means for rendering said moving means effective responsive to loss of pressure in the pressure cabin.

5. In an autopilot for aircraft of the pressure cabin type, an altitude controller having a manually settable knob for determining the flight level of the craft, a normally open circuit having a closed switch therein and a motor operatively connected to said knob to move the same in a direction to lower the elevation of the craft, means for opening said switch to limit the lowermost position that the knob is movable to under control of said motor, and means for closing said circuit responsive to loss of pressure in the pressure cabin.

6. An autopilot as claimed in claim 5, in which said circuit closing means is a relay in a separately energized second circuit.

7. An autopilot as claimed in claim 5, in which said switch opening means includes a second manually settable knob.

8. In an autopilot for aircraft of the pressure cabin type, an altitude controller including a pair of settable means, one of which determines a normal flight level for the craft and the other of which determines a safe flight level for the craft at a lower altitude level than the normal flight level, normally ineffective means connected to operate said normal flight level settable means to cause the craft to descend, means responsive to loss of pressure in the pressure cabin of the craft operable to render said normally ineffective means effective, and means operated by said safe flight level settable means for restoring said normally ineffective means to an ineffective condition when the craft reaches the safe flight level.

9. In an autopilot for aircraft of the pressure cabin type, an altitude controller including a pair of settable means, one of which determines a normal flight level for the craft and the other of which determines a safe flight level for the craft at a lower altitude than the normal flight level, means responsive to loss of pressure in the pressure cabin of the craft operatively connected to said normal flight level settable means to cause the craft to descend, and means operated by said safe flight level settable means for rendering said pressure loss responsive means ineffective when the craft has descended to the safe flight level.

10. An autopilot as claimed in claim 9, in which said altitude controller includes means for determining the pitch angle of descent of the craft.

JOHN NASH.

REFERENCES CITED

The following references are of record in the file of this patent:

UNITED STATES PATENTS

| Number | Name | Date |
| --- | --- | --- |
| 1,794,690 | Horni | Mar. 3, 1931 |
| 1,900,502 | Junkers | Mar. 7, 1933 |
| 2,265,461 | Wagner | Dec. 9, 1941 |
| 2,323,311 | Crane et al. | July 6, 1943 |